(12) United States Patent
Lee et al.

(10) Patent No.: US 8,687,266 B2
(45) Date of Patent: Apr. 1, 2014

(54) DISPLAY DEVICE DRIVEN BY ELECTRIC FIELD

(75) Inventors: Chun-Hyuk Lee, Hwaseong-si (KR); Byung-Uk Kim, Hwaseong-si (KR); Mun-Pyo Hong, Chungcheongnam-do (KR); Hong Choi, Chungcheongnam-do (KR); Byung-Seong Bae, Asan-si (KR)

(73) Assignees: Dongjin Semichem Co., Ltd., Incheon (KR); Korea University Reseaerch and Business Foundation of Korea University, Seoul (KR)

( * ) Notice: Subject to any disclaimer, the term of this patent is extended or adjusted under 35 U.S.C. 154(b) by 18 days.

(21) Appl. No.: 13/503,937

(22) PCT Filed: Oct. 29, 2010

(86) PCT No.: PCT/KR2010/007506
§ 371 (c)(1),
(2), (4) Date: Jun. 29, 2012

(87) PCT Pub. No.: WO2011/053033
PCT Pub. Date: May 5, 2011

(65) Prior Publication Data
US 2012/0262777 A1    Oct. 18, 2012

(30) Foreign Application Priority Data

Nov. 2, 2009  (KR) .................. 10-2009-0105156

(51) Int. Cl.
*G02B 26/00* (2006.01)
(52) U.S. Cl.
USPC .............. 359/296; 359/295; 359/291

(58) Field of Classification Search
USPC .................................. 359/290–296
See application file for complete search history.

(56) References Cited

U.S. PATENT DOCUMENTS

| 7,667,403 | B2 * | 2/2010 | Kwon et al. | 313/582 |
| 7,839,081 | B2 * | 11/2010 | Kubota et al. | 313/506 |
| 8,247,970 | B2 * | 8/2012 | Setoguchi et al. | 313/583 |
| 2010/0134893 | A1 * | 6/2010 | Kim et al. | 359/609 |

FOREIGN PATENT DOCUMENTS

| KR | 1020030038042 A | 5/2003 |
| KR | 100843985 B1 | 7/2008 |
| KR | 1020090035228 A | 4/2009 |
| WO | WO-2005/010605 A1 | 2/2005 |

* cited by examiner

*Primary Examiner* — Mohammed Hasan
(74) *Attorney, Agent, or Firm* — Gifford, Krass, Sprinkle, Anderson & Citkowski, P.C.

(57) ABSTRACT

The present invention relates to an electric-field drive display device. According to one embodiment of the present invention, the electric-field drive display device comprises: a first substrate; a first electrode which is formed on the first substrate; a second electrode which is formed on the first substrate and is disposed in parallel with the first electrode; a drive partition wall which is formed on the first electrode and the second electrode and has a plurality of opening and closing holes; and a plurality of drive bodies which are disposed inside each of the opening and closing holes. Consequently, the electric-field drive display device according to one embodiment of the present invention can adjust the amount of light transmitted and so display the desired image by adjusting the positions of the drive bodies in the horizontal direction through the use of electrical force.

38 Claims, 5 Drawing Sheets

DISPLAY DEVICE DRIVEN BY ELECTRIC FIELD

CROSS-REFERENCE TO RELATED APPLICATIONS

This application is the U.S. National Phase of PCT/KR2010/007506 filed Oct. 29, 2010, which claims priority of Korean Patent Application 10-2009-0105156 filed Nov. 2, 2009.

BACKGROUND OF THE INVENTION (a) Field of the Invention

The present invention relates to a flat panel display, and more particularly, to a display device driven by electric field.

(b) Description of the Related Art

An example of a currently known flat panel display may include a liquid crystal display (LCD), a plasma display panel (PDP), an organic light emitting diode (OLED) display, a field effect display (FED), an eletrophoretic display, or the like.

Among others, the liquid crystal display has been prevalently as a monitor, a television, etc., the plasma display panel has been as a large television, and the organic light emitting display is used for a mobile phone window, etc. Research into the organic light emitting display for applying to a mid-large sized display has been actively progressed. Research into other field effect display devices or the electrophorectic display device for applying to monitor, television, E-paper, has been progressed.

In particular, as the display applied to the E-paper, the reflective electrophorectic display having similar texture to paper is used representatively; however, has disadvantages such as high driving voltage, slow response speed, and hard gray scale representation. In addition, in order to perform the color representation, there is a problem in that the reflective electrophorectic display necessarily uses a color filter.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a display device driven by electric field with low driving voltage and improved response speed, as compared with E-paper of the related art.

An exemplary embodiment of the present invention provides a display device driven by electric field, including: a first substrate; a first electrode formed on the first substrate; a second electrode formed on the first substrate and disposed in parallel with the first electrode; a driving barrier rib formed on the first electrode and the second electrode and having a plurality of opening and closing holes; and a plurality of driving bodies disposed in each opening and closing hole.

The display device driven by electric field may further include a second substrate disposed on the driving barrier rib; and a light shielding layer formed on the second substrate.

The opening and closing hole may include the light shielding unit and the light transmitting unit, wherein the light shielding layer is disposed at the light shielding unit.

The display device driven by electric field may further include a color filter formed on the second substrate, corresponding to the light transmitting unit.

The first electrode may be disposed at the light shielding unit and the second electrode may be disposed at the light transmitting unit.

The display device driven by electric field may further include a first control electrode formed to overlap with the second electrode.

The first control electrode may be formed on the same layer as the first electrode.

The second electrode may have an opening exposing a portion of the first control electrode.

The display device driven by electric field may further include a second control electrode adjacently formed to the same layer as the second electrode.

A gap between the first electrode and the second electrode may be equal to or larger than the diameter of the driving body.

The display device driven by electric field may further include a first insulating layer covering the first electrode, wherein the second electrode is formed on the first insulating layer.

The driving body may be made of a non-transmitting material having charge.

The position of the driving body may be determined by driving voltage applied to the first electrode and the second electrode.

The first electrode and the second electrode may be applied with the driving voltage having different opposite polarities.

The second electrode may be made of a transmitting conductive material.

The driving body may move between the light shielding unit and the light transmitting unit when the driving voltage is applied thereto in order to open and close light.

The first control electrode or the second control electrode may be applied with control voltage having opposite polarity to the driving voltage applied to the second electrode when the driving body is disposed at the light transmitting unit.

The first control electrode or the second control electrode may be applied with control voltage having the same magnitude and polarity as the driving voltage applied to the second electrode when the driving body is disposed at the light shielding unit.

The display device driven by electric field may further include a backlight unit supplying light for display to the first substrate.

The opening and closing hole may include the light shielding unit and a reflector, the light shielding layer is disposed at the light shielding unit, and the reflector is further provided with a light absorbing layer.

The display device driven by electric field may further include a first control electrode formed to overlap with the second electrode, wherein the light absorbing layer is formed below the first control electrode.

The driving body may be made of a total reflection material having charges.

The driving body may have any one of white, red, green, blue, yellow, magenta, and cyan.

Light may be totally reflected when the driving body is disposed at the reflector.

The opening and closing hole may include the light shielding unit and the reflector and the light shielding unit may be provided with the light shielding layer and the second electrode.

The reflector may be provided with the first electrode, wherein the first electrode is made of a non-transmitting conductive material.

The display device driven by electric field may further include: a second insulating layer having higher reflective index than the first insulating layer formed between the first insulating layer and the second electrode.

Light reflected from the first electrode may be totally reflected at the interface between the first insulating layer and the second insulating layer.

The driving body may be made of a total reflection material having charges.

Another exemplary embodiment of the present invention provides a method for manufacturing a display device driven by electric field, the method including: forming a first electrode extending in a predetermined direction on a first substrate; forming a first insulating layer covering the first electrode; forming a second electrode on the second insulating layer in parallel with the first electrode; forming a driving barrier rib having a plurality of opening and closing holes on the first electrode and the second electrode; injecting a plurality of driving bodies in the opening and closing hole; and coupling a second substrate formed with a light shielding unit on the driving barrier rib.

The method for manufacturing a display device driven by electric field may further include forming a first control electrode at a position overlapping with the second electrode on the same layer as the first electrode.

The method for manufacturing a display device driven by electric field may further include forming a second control electrode at a position adjacent to the second electrode on the same layer as the second electrode.

The method for manufacturing a display device driven by electric field may further include forming a color filter on the second substrate.

A driving body made of a non-transmitting material having charges may be injected into the opening and closing hole and the light shielding layer may be formed at a position corresponding to the first electrode.

A driving body made of a total reflection material having charges may be injected into the opening and closing hole and the light shielding layer may be formed at a position corresponding to the first electrode.

The method for manufacturing a display device driven by electric field may further include forming a light absorbing layer below the first control electrode.

A driving body made of a total reflection material having charges may be injected into the opening and closing hole and the light shielding layer may be formed at a position corresponding to the second electrode.

The method for manufacturing a display device driven by electric field may further include forming a second insulating layer having higher reflective index than the first insulating layer on the first insulating layer.

DETAILED DESCRIPTION OF THE EMBODIMENTS

Figure 1:
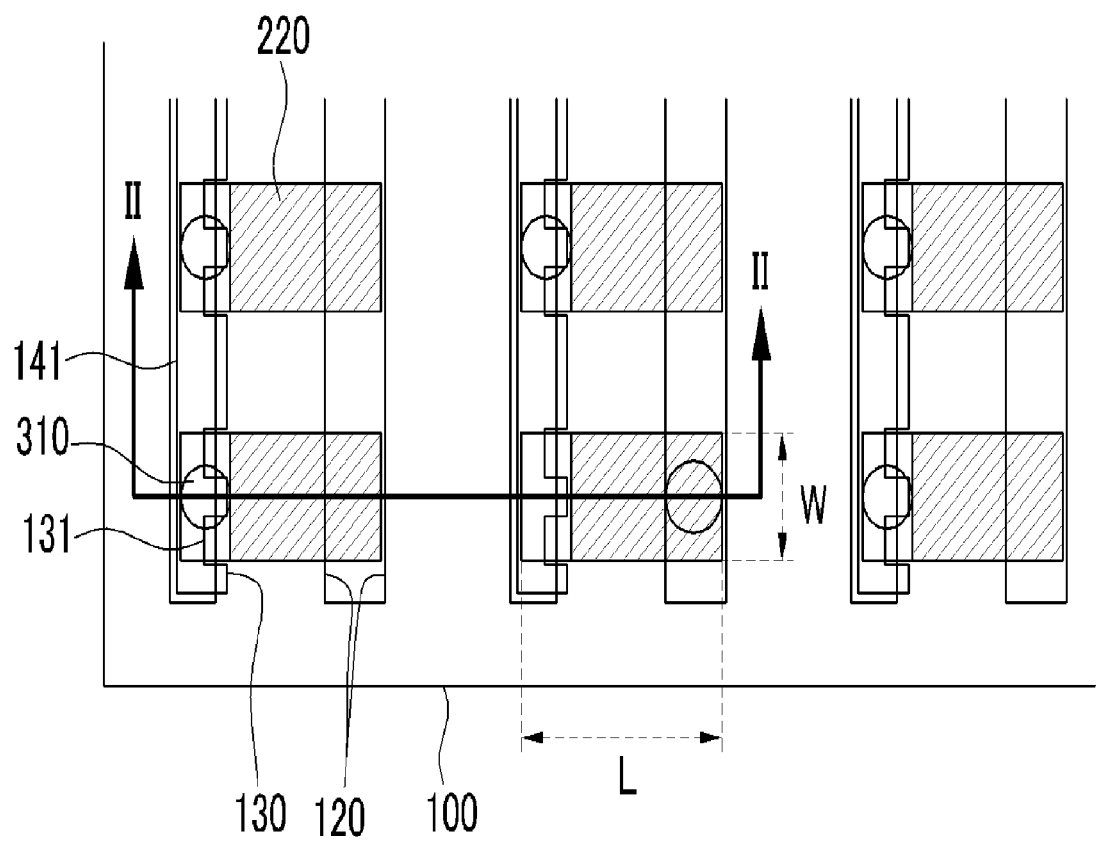
FIG. 1 is a plan view showing a display device driven by electric field according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device driven by electric field according to an exemplary embodiment of the present invention will be described with reference to FIGS. 1 and 2.

Figure 2:
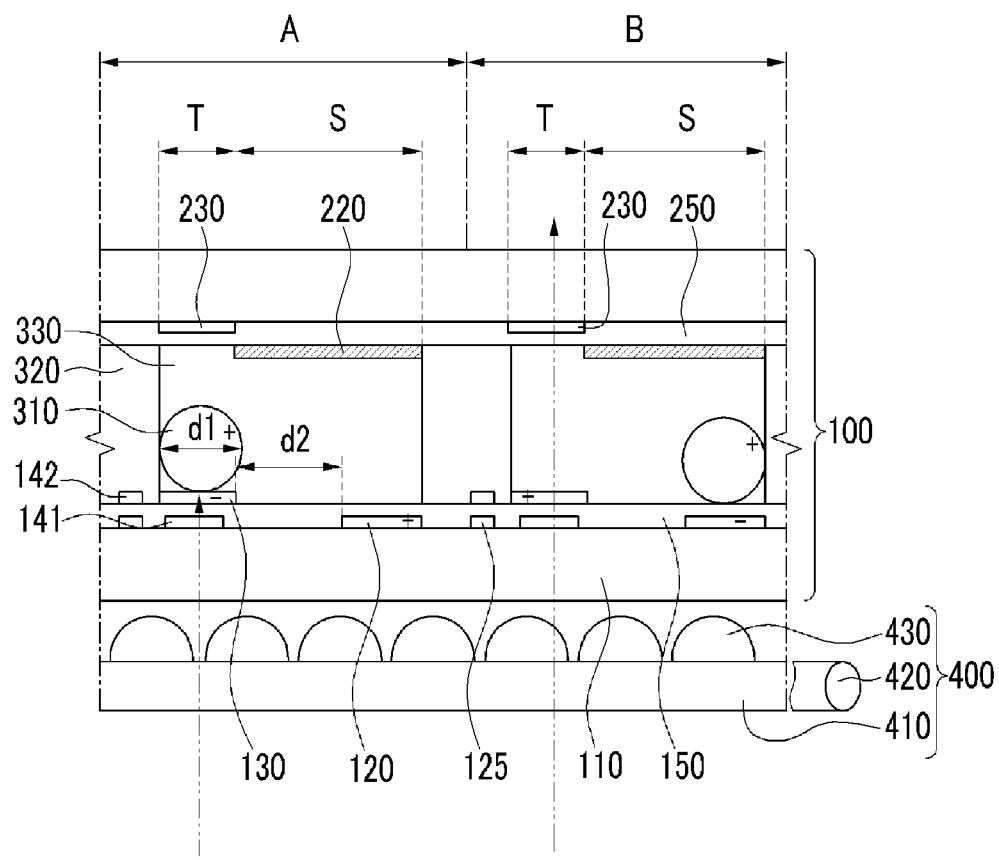
FIG. 2 is a cross-sectional view taken along line II-II of the display device driven by electric field shown in FIG. 1.

FIG. 1 is a plan view showing a display device driven by electric field according to an exemplary embodiment of the present invention and FIG. 2 is a cross-sectional view taken along line II-II of the display device driven by electric field shown in FIG. 1.

As shown in FIGS. 1 and 2, a display device driven by electric field according to an exemplary embodiment of the present invention includes a display panel 100 and a backlight unit 400.

A display panel 100 is a part displaying images by controlling light amount. The display panel 100 includes a lower substrate 110 on which a first electrode 120 and a second electrode 130 are formed, an upper substrate 210 opposite to the lower substrate 110 and having a light shielding layer 220 thereon, a driving barrier rib 320 disposed between the lower substrate 110 and the upper substrate 210 and having a plurality of opening and closing holes 330, and driving bodies 310 disposed in the opening and closing holes 330.

The first electrode 120 is formed on the transparent lower substrate 110 composed of a glass substrate, a flexible substrate, etc., while lengthily extending in a predetermined direction and the first control electrode 141 is disposed thereon in parallel with the first electrode in the same direction as the first electrode 120.

The first electrode 120 may be made of a transparent conductive material such as indium tin oxide (ITO), indium zinc oxide (IZO), etc., or an opaque conductive material such as Cr, Al, Mo, etc., and the first control electrode 141 may be made of a transparent conductive material such as indium tin oxide (ITO), indium zinc oxide (IZO), etc.

Switching devices 125 for individually switching voltage applied to the first electrode 121 are formed on the lower substrate 110 and is connected to the first electrode 121. As the switching device 125, a thin film transistor may be used. In this case, the switching devices 125 may be formed on the lower substrate 110 in a type where a gate line (not shown) transferring a scan signal for turning-on and turning-off the thin film transistor and a data line (not shown) transferring a gray voltage applied to the first electrode 121 intersects with each other. The thin film transistor may include a gate electrode, a source electrode, a drain electrode, and semiconductor.

A first insulating layer 150 is formed on the lower substrate 110, the first electrode 120, and the first control electrode 141. The first insulating layer 150 has a single layer structure composed of an organic layer and may have photosensitivity. In addition, the first insulating layer 150 may be composed of an inorganic layer of silicon nitride, silicon oxide, etc., and may have a multilayer structure of an inorganic layer and an organic layer.

The second electrode 130 is disposed on the first insulating layer 150 in parallel with the first electrode 120. The second electrode 130 is disposed at a position where it overlaps with the first control electrode 141 and is provided with a plurality of openings 131 exposing a portion of the first control electrode 141 so that electric field from the first control electrode 141 is arrived at the driving bodies 310.

The second electrode 130 may be made of a transparent conductive material such as indium tin oxide (ITO), indium zinc oxide (IZO), or the like.

In addition, the second control electrode 142 may be disposed on the first insulating layer 150 at a position where a driving barrier rib 320 is formed. The second control electrode 142 is adjacently positioned to the second electrode 130, thereby making it possible to prevent the driving body 310 disposed on the second electrode 130 from flowing.

The driving barrier rib 320 formed on the first insulating layer 150 may be formed by coating, exposing, and developing a photosensitive material. The driving barrier rib 320 may be made of an opaque material through which light is not transmitted. For example, the driving barrier rib 320 is made of a black color material to transmit or reflect unnecessary light, thereby making it possible to prevent the deterioration in display quality.

The opening and closing hole 330 is a rectangular parallelepiped shape, wherein the cross section thereof is a rectangular shape. The opening and closing hole 330 is configured to include a light shielding unit S shielding light and a transmitting unit T transmitting light.

The opening and closing hole 330 is provided with the driving body 310 having a spherical shape determined by an electric force. The driving body 310 has positive or negative charge. The driving body 310 may be made of a non-transmitting material of a black color to exclude the reflected light. A size of a diameter d1 of the driving body 310 is several micrometer to several tens micrometer and may be equal to or less than a gap d2 between the first electrode 120 and the second electrode 130.

Therefore, the driving body 310 has a small size and is thus operated at high speed due to a driving voltage of several voltages V. Therefore, the response speed of the driving body 310 is very rapid and the position of the driving 310 can be precisely controlled. Since the operating speed of the driving body 310 is in inverse proportion to a weight, the central portion of the driving body 310 is formed to have a cavity, thereby making it possible to reduce the weight of the driving body 310.

The width w of the opening and closing hole 330 may be larger than the diameter d1 of the driving body 310 and the length L of the opening and closing hole 330 may be larger than the diameter dl of the driving body 310. Therefore, when the driving voltage is applied, the driving body 370 may freely move in the space of the opening and closing hole 330.

The opening and closing hole 330 includes inert gas (not shown) such as argon, neon, helium, etc., together with the driving body 310. The opening and closing hole 330 may be filled with other gas suitable for conserving charges owned by the driving body 310, such as nitrogen or dried air, instead of the inert gas. In addition, the opening and closing hole 330 may be maintained in a vacuum state and may be filled with at least one of liquid without polarity or with a little polarity, solvent having small surface energy, and liquid crystal.

The upper substrate 210 is disposed on the driving barrier rib 310. A color filter 230 such as red, green, blue, etc., is formed at a position corresponding to the transmitting unit T on the upper substrate 210. A passivation layer 250 is formed on the color filter 230 to protect the color filter 230. A light shielding layer 220 is formed at a position corresponding to the light shielding unit S on the passivation layer 250. The light shielding layer 220 may be made of a non-transmitting material.

A backlight unit 400 supplies light to the display panel 100. The backlight unit includes a lamp 420 emitting light, a light guide plate 410 converting light emitted from the lamp 420, which is a linear light source or a point light source, into a surface light source, and a light collecting lens 430 collecting light from the light guide plate 410 and progressing the light to the opening and closing hole 330 that is a display region. As the lamp 420, a linear light source such as a cold cathode fluorescent lamp (CCFL), an external electrode fluorescent lamp (EEFL), etc., or a point light source such a light emitting diode (LED), etc., may be used. Alternatively, a surface light source may also be used. In this case, the light guide plate 410 may be omitted. Further, the light collecting lens 430 may be directly formed on the surface of the light guide plate 410, or may be formed thereon in a single layer, or a separate film type. Alternatively, the light collecting lens 430 may be formed on the display panel 100 in a single layer. The backlight unit 400 may be disposed on either the lower substrate 110 or the upper substrate 210.

An image display method and a method for controlling the driving bodies for the first and second control electrodes in the display device driven by electric field according to the exemplary embodiment of the present invention will be described below with reference to FIGS. 1 and 2.

As shown in FIGS. 1 and 2, the display device driven by electric field applies an electric force to the driving bodies 310 included in the opening and closing hole 330 to move the positions of the driving bodies. When the driving voltage is applied to the first electrode 120 and the second electrode 130, electric field is formed therebetween to apply the electric force to the driving bodies 310 having charges, such that the driving bodies 310 move in the opening and closing hole 330. The first electrode 120 and the second electrode 130 are applied with the driving voltage having different opposite polarities. For example, when the driving body 310 has a positive charge, the first electrode 120 becomes a negative electrode and the second electrode 130 becomes a positive electrode, such that the driving bodies 310 move in the first electrode 120 direction and are positioned at the light shielding unit S. In addition, when the driving bodies 310 have a positive charge, the first electrode 120 becomes a positive electrode and the second electrode 130 becomes a negative electrode, such that the driving bodies 310 move in the second electrode 130 direction, positioned at the light transmitting unit T, and contact the second electrode 130. As such, when the driving bodies 310 are applied with the driving voltage, they move between the light shielding unit S and the light transmitting unit T to open and close light emitted from the backlight unit 400, thereby making it possible to display the desired images.

In FIG. 2, portion A indicates that the driving bodies 310 of a non-transmitting material are positioned at the light emitting unit T to shield light emitted from the backlight unit 400 by the driving bodies 310, thereby implementing a black state. Meanwhile, in FIG. 2, portion B indicates that the driving bodies 310 are positioned at the light shielding unit S to transmit light emitted from the backlight unit 400 as it is, thereby implementing colors of the color filter 230.

Meanwhile, the first control electrode 141 and the second control electrode 142 control the driving bodies 310 with the separate control voltage in order to prevent the flowing of the driving bodies. This will be described in detail below.

When the driving bodies 310 are positioned at the light transmitting unit T to contact the second electrode 130, the potential of the second electrode 130 is equal to that of the driving body 310, such that the driving body 310 may be separated from the second electrode 130. In order to prevent it, the first control electrode 141 is applied with the separate control voltage having different polarity from potential of the driving body 310 to apply attraction between the first control electrode 141 and the driving body 310. Therefore, the driving body 310 maintains a state contacting the second electrode 130. For example, when the second electrode 130 is the driving voltage of negative polarity of −5V, the driving body 310 contacting the second electrode 130 has the potential of the same magnitude, such that the driving body 310 may be separated from the second electrode 130. Therefore, the first control electrode 141 is applied with the control voltage of a predetermined magnitude of positive polarity to apply attraction between the first control electrode 141 and the driving body 310, such that the driving body 310 maintains a state in which it contacts the second electrode 130.

When the first control electrode 141 is applied with the control voltage having the same polarity and magnitude as those of the second electrode 130, the driving body 310 contacting the second electrode 130 is separated from the second electrode 130 to move to the first electrode 120 disposed at the light shielding unit S. The driving body 310 moving to the light shielding unit S does not contact the first electrode 120 due to the first insulating layer 150 formed on the first electrode 120, such that the driving body 310 is fixed to the light shielding unit S.

Meanwhile, the second control electrode 142 is also applied with a predetermined control voltage, such that the driving body 310 may maintain a state in which it contacts the second electrode 130.

A method for manufacturing the display device driven by electric field according to the exemplary embodiment of the present invention will be described in detail with reference to FIGS. 3 to 5.

Figure 3:
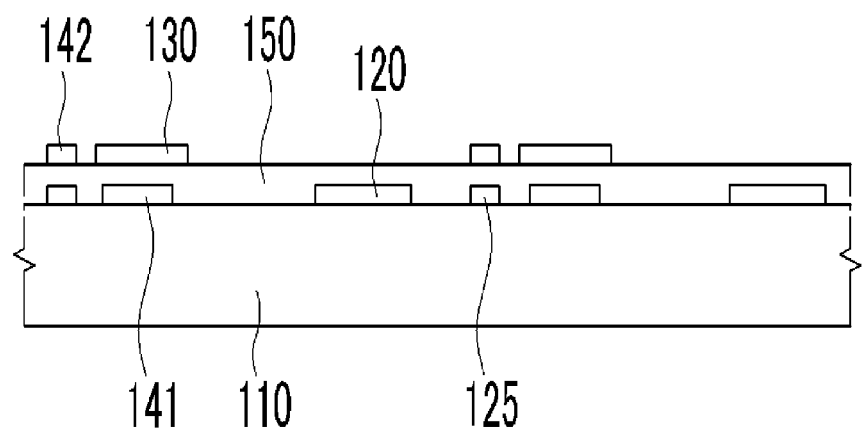
FIGS. 3 to 5 are cross-sectional views sequentially showing a method for manufacturing the display device driven by electric field according to an exemplary embodiment of the present invention.
Figure 4:
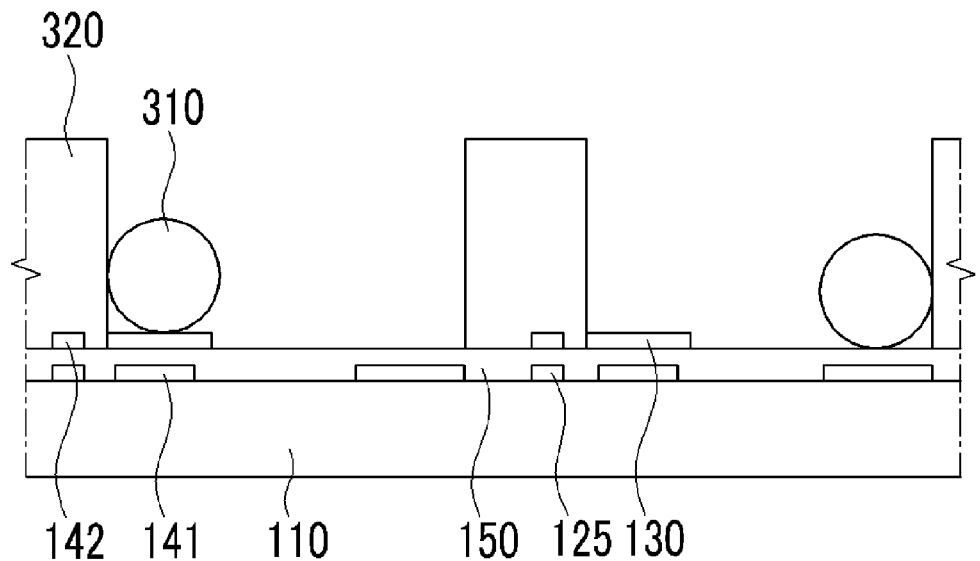
Figure 5:
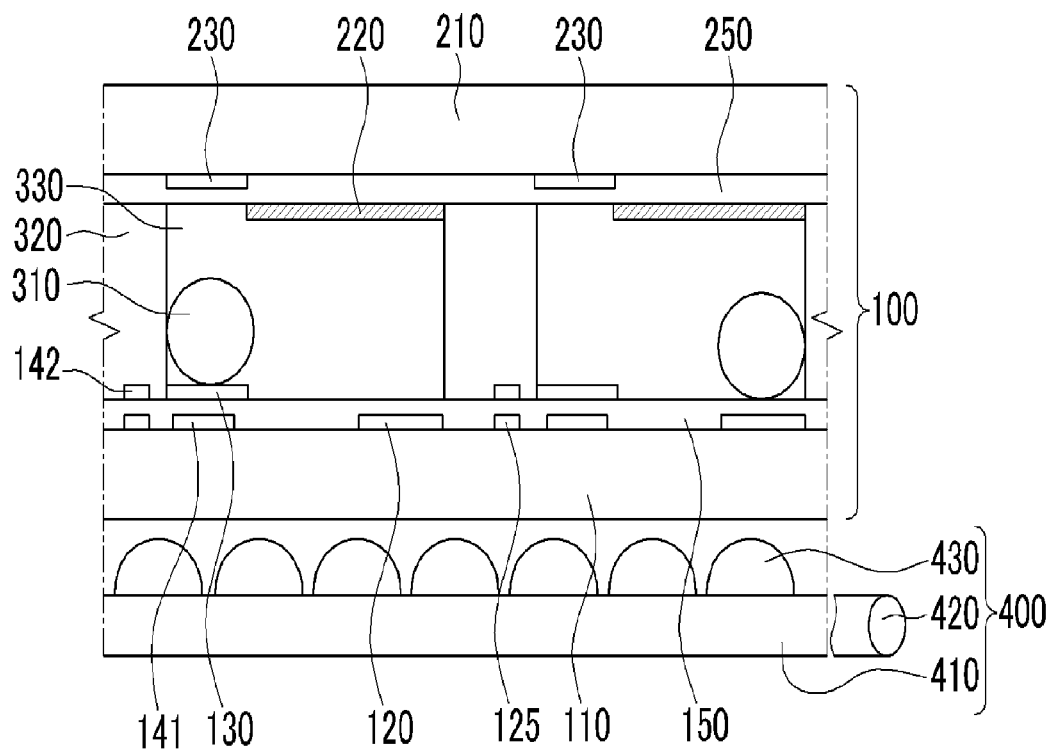

FIGS. 3 to 5 are cross-sectional views sequentially showing a method for manufacturing the display device driven by electric field according to the exemplary embodiment of the present invention.

First, as shown in FIG. 3, the first electrode 120 made of a transparent conductive material such as ITO or IZO, etc., or an opaque conductive material such as Cr, Al, Mo, etc., is formed on the lower substrate 110 composed of a glass substrate or a flexible substrate and the first control electrode 141 made of a transparent conductive material such as ITO or IZO, etc., is sequentially formed on the same layer. The first insulating layer 150 covering the first electrode 120 and the first control electrode 141 is formed on the same layer. The second electrode 130 made of a transparent conductive material such as ITO or IZO is formed on the first insulating layer 150 and the second control 142 made of the transparent conductive material such as ITO or IZO, etc. or the opaque conductive material such as Cr, Al, Mo, etc., is sequentially formed on the same layer.

Next, as shown in FIG. 4, the barrier ribs 320 partitioning a plurality of driving regions 330 are formed and the plurality of driving bodies 310 are injected into the plurality of driving regions 330. In this case, a mixture of the driving bodies 310 may be injected into the driving region, together with at least one of liquid without polarity or with a little polarity, solvent having small surface energy, and liquid crystal. In addition, the driving body 310 may be injected by using a thin metal tip coated with the insulating layer.

Next, as shown in FIG. 5, the upper substrate 210 on which the color fitter 230, the passivation layer 250, and the light shielding layer 220 are formed is coupled with the lower substrate 110, thereby completing the display panel 100. The backlight unit 400 is coupled with the lower substrate 110, thereby completing the display device driven by lateral electric field.

Although the present exemplary embodiment describes the transmission display driven by electric field displaying the desired image by opening and closing light provided by the backlight unit 400, a structure for preventing the flowing of the driving body 310 using the separate first and second control electrodes may be applied even when the reflective display device driven by electric field displaying the desired images by opening and closing the external light.

The reflective display device driven by electric field implementing a black state by using a light absorbing layer will be described in detail with reference to FIG. 6.

Figure 6:
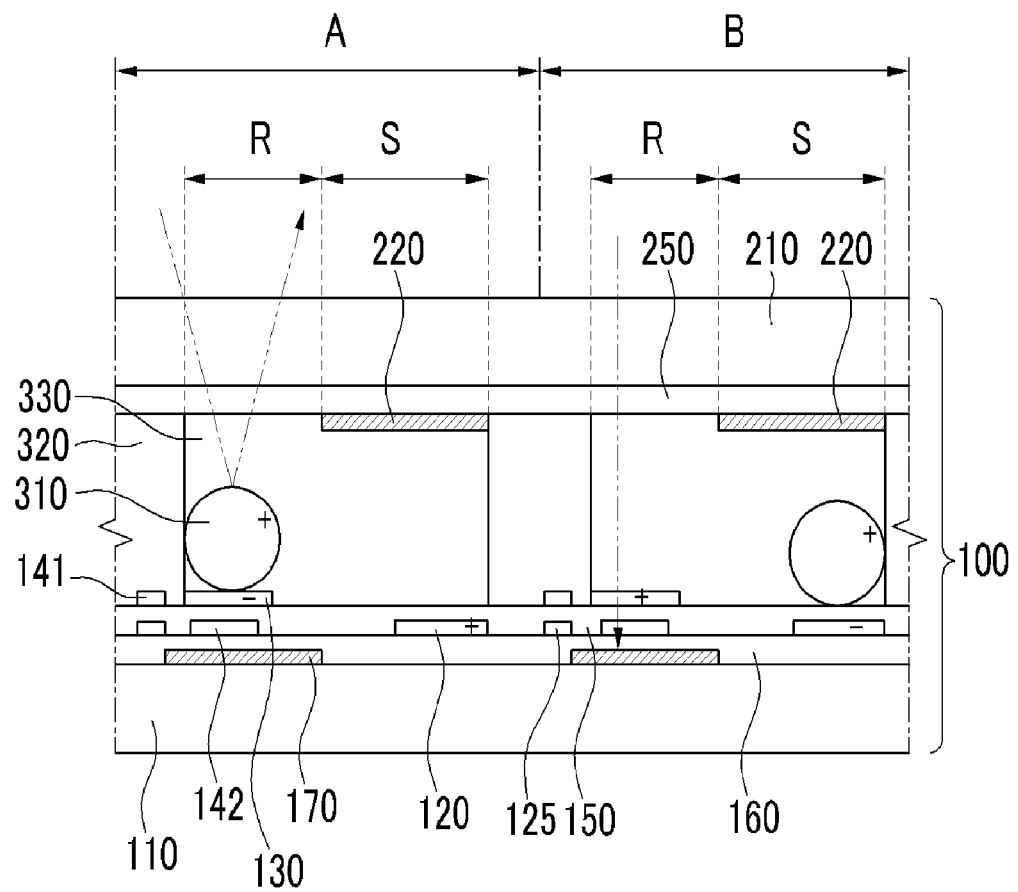
FIG. 6 is a cross-sectional view of a display device driven by electric field according to another exemplary embodiment of the present invention.

FIG. 6 is a cross-sectional view of a display device driven by electric field according to another exemplary embodiment of the present invention.

The present exemplary embodiment is substantially the same as the exemplary embodiments shown in FIGS. 1 and 2 except for only the structure in which the driving body made of the total reflection material having colors and the light absorbing layer are formed in order to use the external light and therefore, the repeated description thereof will be omitted.

As shown in FIG. 6, the display device driven by electric field according to another exemplary embodiment of the present invention has only the display panel 100 and does not have the backlight unit 400.

The light absorbing layer 170 made of a non-transmitting material is formed on the lower substrate 110 of the display panel 100. The light absorbing layer 170 may be formed at a position corresponding to a reflector R.

The second insulating layer 160 is formed on the light absorbing layer 170 and the first electrode 120 and the first control electrode 141 are disposed on the second insulating layer 160. The first insulating layer 150 is formed on the second insulating layer 160, the first electrode 120, and the first control electrode 141. The second electrode 130 is disposed on the first insulating layer 150 in parallel with the first electrode 120 and the driving barrier rib 320 having the opening and closing hole 330 is formed on the first insulating layer 150. The opening and closing hole 330 includes the light shielding unit S shielding light and the reflector R reflecting light. The light shielding unit S may be formed at a position in which it overlaps with the first electrode 120 and the reflector R may be formed at a position in which it overlaps with the second electrode 130. The opening and closing hole 330 is disposed with the driving body 310 having a spherical shape of which the position is determined by an electric force. The driving body 310 has a positive or negative charge. The driving body 310 may be made of a material capable of totally reflecting light and may have any one selected from white, red, green, blue, yellow, magenta, and cyan. Therefore, a separate color filter is not required.

The upper substrate 210 is coupled on the driving barrier 310. The passivation layer 250 is formed on the upper substrate 210 and the light shielding layer 220 is formed at a position corresponding to the light shielding unit S on the passivation layer 250.

The reflective display device driven by electric field controls the external amount of light reflected by the driving body 310, thereby implementing images. That is, as shown in portion A of FIG. 6, when the driving body 310 is disposed at the reflector R, the external light is totally reflected by the driving body 310 made of the total reflection material, such that the colors are implemented by the colors of the surface of the driving body 310. In addition, as in portion B of FIG. 6, when the driving body 310 is disposed at the light shielding unit S, the external light is absorbed into the light absorbing layer 170, such that the black state is implemented.

As described above, the black state may be implemented by totally absorbing the external light by using the light absorbing layer 170 but the second insulating layer 170 having higher refractive index is formed on the first insulating layer 150 to totally reflect the external light, thereby making it possible to implement the black state.

The reflective display device driven by electric field implementing the black state using the total reflection will be described below with reference to FIG. 7.

Figure 7:
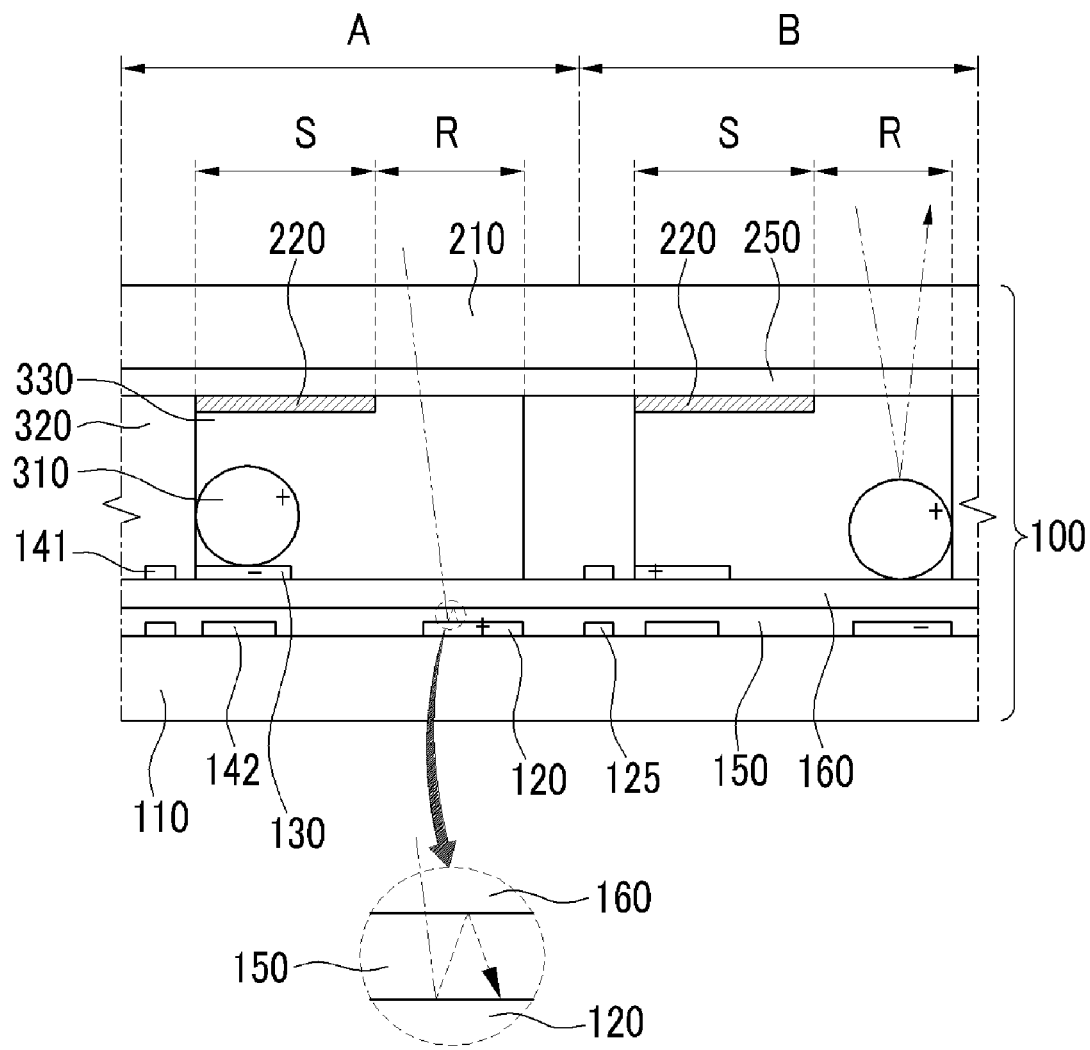
FIG. 7 is a cross-sectional view of display device driven by electric field according to yet another exemplary embodiment of the present invention.

FIG. 7 is a cross-sectional view of a display device driven by electric field according to yet another exemplary embodiment of the present invention.

The present exemplary embodiment is substantially the same as the exemplary embodiment shown in FIG. 6 except that it does not require the separate light absorbing layer and the position of the second insulating layer is different and therefore, the repeated description thereof will be omitted.

As shown in FIG. 7, the display device driven by electric field according to another exemplary embodiment of the present invention has only the display panel 100 and does not include the backlight unit 400.

The first electrode 120 and the first control electrode 141 are disposed on the lower substrate 110 of the display panel 100. The first insulating layer 150 is formed on the lower substrate 110, the first electrode 120, and the first control electrode 141. The second insulating layer 160 having the higher reflective index than that of the first insulating layer 150 is formed on the first insulating layer 150. The second electrode 130 is disposed on the second insulating layer 160 in parallel with the first electrode 120 and the driving barrier rib 320 having the opening and closing hole 330 is formed on the second insulating layer 160. The opening and closing hole 330 includes the light shielding unit S shielding light and a reflector R capable of reflecting light. The light shielding unit S may be formed at a position in which it overlaps with the second electrode 130 and the reflector R may be formed at a position in which it overlaps with the first electrode 120. The opening and closing hole 330 is disposed with the driving body 310 having a spherical shape of which the position is determined by the electric force. The driving body 310 has a positive or negative charge. The driving body 310 may be made of a material capable of totally reflecting light and may have any one selected from white, red, green, blue, yellow, magenta, and cyan. Therefore, a separate color filter is not required.

The upper substrate 210 is coupled on the driving barrier rib 310. The passivation layer 250 is formed on the upper substrate 210 and the light shielding layer 220 is formed at the position corresponding to the light shielding unit S on the passivation layer 250.

The reflective display device driven by electric field controls the external amount of light reflected by the driving body 310, thereby implementing the images. In other words, as in portion A of FIG. 7, when the driving body 310 is disposed at the light shielding unit S, the external light is not reflected, thereby implementing the black state. That is, the external light passes through the second insulating layer 160 and the first insulating layer 150 and some thereof is absorbed in the first electrode 120 and some thereof is reflected from the first electrode 120. The reason is that the first electrode 120 is made of an opaque metal. Some light reflected from the first electrode 120 is totally reflected at the interface between the second insulating layer 160 and the first insulating layer 150. In order to implement the total reflection, the second insulating layer 160 may have the higher reflective index than the first insulating layer 150. Therefore, the external light is not emitted to the front surface, thereby implementing the black state. In addition, as in portion B of FIG. 7, when the driving bodies 310 is positioned at the reflector R, the external light is totally reflected by the driving body 310 made of the total reflection material, such that colors are implemented by the colors of the surface of the driving body 310.

According to the present invention, the positions of the driving bodies are controlled in a horizontal direction by using the electric force formed in a horizontal direction to control the transmittance of light, thereby making it possible to display the desired image.

In addition, the present invention can prevent the flowing of the driving bodies by forming the first control electrode below the second electrode or forming the second control electrode beside the second electrode to store the information and display the images when the final driving voltage is applied, thereby making it possible to give the conservation like the printed matters, etc.

In addition, the present invention can precisely control the positions of the driving bodies by using the first and the second control electrode to more precisely control the transmittance of light passing through the driving region, thereby making it possible to implement the precise image.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device driven by electric field, comprising:
   a first substrate;
   a first electrode formed on the first substrate;
   a second electrode formed on the first substrate and disposed in parallel with the first electrode;
   a driving barrier rib formed on the first electrode and the second electrode and having a plurality of opening and closing holes; and
   a plurality of driving bodies disposed in each opening and closing hole, wherein the driving body is a moving ball.

2. The device of claim 1, further comprising:
   a second substrate disposed on the driving barrier rib; and
   a light shielding layer formed on the second substrate.

3. The device of claim 2, wherein:
   the opening and closing hole includes the light shielding unit and the light transmitting unit, the light shielding layer being disposed at the light shielding unit.

4. The device of claim 3, further comprising:
   a color filter formed on the second substrate, corresponding to the light transmitting unit.

5. The device of claim 4, wherein:
the first electrode is disposed at the light shielding unit and the second electrode is disposed at the light transmitting unit.

6. The device of claim 5, further comprising:
a first control electrode formed to overlap with the second electrode.

7. The device of claim 6, wherein:
the first control electrode is formed on the same layer as the first electrode.

8. The device of claim 7, wherein:
the second electrode has an opening exposing a portion of the first control electrode.

9. The device of claim 6, further comprising:
a second control electrode adjacently formed to the same layer as the second electrode.

10. The device of claim 5, wherein:
a gap between the first electrode and the second electrode is equal to or larger than the diameter of the driving body.

11. The device of claim 4, further comprising:
a first insulating layer covering the first electrode,
wherein the second electrode is formed on the first insulating layer.

12. The device of claim 4, wherein:
the driving body is made of a non-transmitting material having charge.

13. The device of claim 5, wherein:
the position of the driving body is determined by driving voltage applied to the first electrode and the second electrode.

14. The device of claim 13, wherein:
the first electrode and the second electrode are applied with the driving voltage having different opposite polarities.

15. The device of claim 14, wherein:
the second electrode is made of a transmitting conductive material.

16. The device of claim 15, wherein:
the driving body moves between the light shielding unit and the light transmitting unit when the driving voltage is applied thereto in order to open and close light.

17. The device of claim 14, wherein:
the first control electrode or the second control electrode is applied with control voltage having opposite polarity to the driving voltage applied to the second electrode when the driving body is disposed at the light transmitting unit.

18. The device of claim 14, wherein:
the first control electrode or the second control electrode is applied with control voltage having the same magnitude and polarity as the driving voltage applied to the second electrode when the driving body is disposed at the light shielding unit.

19. The device of claim 16, further comprising:
a backlight unit supplying light for display to the first substrate.

20. The device of claim 2, wherein:
the opening and closing hole includes the light shielding unit and a reflector, the light shielding layer is disposed at the light shielding unit, and the reflector is further provided with a light absorbing layer.

21. The device of claim 20, further comprising:
a first control electrode formed to overlap with the second electrode,
wherein the light absorbing layer is formed below the first control electrode.

22. The device of claim 20, wherein:
the driving body is made of a total reflection material having charges.

23. The device of claim 22, wherein:
the driving body has any one of white, red, green, blue, yellow, magenta, and cyan.

24. The device of claim 23, wherein:
light is totally reflected when the driving body is disposed at the reflector.

25. The device of claim 2, wherein:
the opening and closing hole includes the light shielding unit and the reflector,
the light shielding unit is provided with the light shielding layer and the second electrode.

26. The device of claim 25, wherein:
the reflector is provided with the first electrode, the first electrode being made of a non-transmitting conductive material.

27. The device of claim 26, further comprising:
a second insulating layer having higher reflective index than the first insulating layer formed between the first insulating layer and the second electrode.

28. The device of claim 27, wherein:
light reflected from the first electrode is totally reflected at the interface between the first insulating layer and the second insulating layer.

29. The device of claim 28, wherein:
the driving body is made of a total reflection material having charges.

30. A method for manufacturing a display device driven by electric field, comprising:
forming a first electrode extending in a predetermined direction on a first substrate;
forming a first insulating layer covering the first electrode;
forming a second electrode on the second insulating layer in parallel with the first electrode;
forming a driving barrier rib having a plurality of opening and closing holes on the first electrode and the second electrode;
injecting a plurality of driving bodies in the opening and closing hole; and
coupling a second substrate formed with a light shielding unit on the driving barrier rib, wherein the driving body is a moving ball.

31. The method of claim 30, further comprising:
forming a first control electrode at a position in which it overlaps with the second electrode on the same layer as the first electrode.

32. The method of claim 31, further comprising:
forming a second control electrode at a position adjacent to the second electrode on the same layer as the second electrode.

33. The method of claim 31, further comprising:
forming a color filter on the second substrate.

34. The method of claim 33, wherein:
a driving body made of a non-transmitting material having charges is injected into the opening and closing hole and the light shielding layer is formed at a position corresponding to the first electrode.

35. The method of claim 31, wherein:
a driving body made of a total reflection material having charges is injected into the opening and closing hole and the light shielding layer is formed at a position corresponding to the first electrode.

36. The method of claim 35, further comprising:
forming a light absorbing layer below the first control electrode.

37. The method of claim 31, wherein:

a driving body made of a total reflection material having charges is injected into the opening and closing hole and the light shielding layer is formed at a position corresponding to the second electrode.

38. The method of claim 37, further comprising:

forming a second insulating layer having higher reflective index than the first insulating layer on the first insulating layer.

* * * * *